(12) United States Patent
Zhou et al.

(10) Patent No.: US 8,971,563 B2
(45) Date of Patent: Mar. 3, 2015

(54) DOCKING STATION FOR ELECTRONIC DEVICE

(75) Inventors: Cong-Bing Zhou, Shenzhen (CN); Chia-Te Yu, New Taipei (TW); Lin-Lin Pan, Shenzhen (CN); Quan-Chang Cheng, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 630 days.

(21) Appl. No.: 13/217,143

(22) Filed: Aug. 24, 2011

(65) Prior Publication Data

US 2013/0039521 A1   Feb. 14, 2013

(30) Foreign Application Priority Data

Aug. 8, 2011   (CN) .......................... 2011 1 0225684

(51) Int. Cl.
  *H04R 1/02* (2006.01)
  *G06F 1/16* (2006.01)
  *H04R 5/04* (2006.01)

(52) U.S. Cl.
  CPC ............ *G06F 1/1626* (2013.01); *G06F 1/1632* (2013.01); *H04R 5/04* (2013.01); *H04R 2205/021* (2013.01)
  USPC ......................................... 381/388; 381/387

(58) Field of Classification Search
  USPC ................................................. 381/387, 388
  See application file for complete search history.

(56) References Cited

U.S. PATENT DOCUMENTS

| 6,581,420 | B1 * | 6/2003 | Ling et al. | ......................... 70/58 |
| 8,488,832 | B2 * | 7/2013 | Leung | ............................ 381/387 |
| 2005/0221874 | A1 * | 10/2005 | Cho et al. | .................... 455/575.4 |
| 2009/0175480 | A1 * | 7/2009 | Zhou | ............................... 381/375 |

\* cited by examiner

*Primary Examiner* — Davetta W Goins
*Assistant Examiner* — Amir Etesam
(74) *Attorney, Agent, or Firm* — Novak Druce Connolly Bove + Quigg LLP

(57) ABSTRACT

A docking station includes a main body, a supporting arm projecting from the main body, and a rotating member rotatably coupled to the supporting arm and retaining the electronic device. The rotating member is capable of rotating from a first position to a second position different from the first position, when the rotating member rotates to the first position, the electronic device is supported in a first orientation, and when the rotating member rotates to the second position, the electronic device is supported in a second orientation.

2 Claims, 5 Drawing Sheets

DOCKING STATION FOR ELECTRONIC DEVICE

BACKGROUND

1. Technical Field

The present disclosure relates to a docking station for an electronic device.

2. Description of Related Art

Hand-held electronic devices, such as mobile phones, often use docking stations for support. The docking station usually includes a main body and one or more interfaces (such as a USB port) projecting out of the main body. The interface can be inserted into the electronic device, whereby the electronic device is electrically connected to the docking station. However, the docking station always supports the electronic device in a particular orientation, and the docking station cannot be used to support the electronic device in another position.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the eight views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
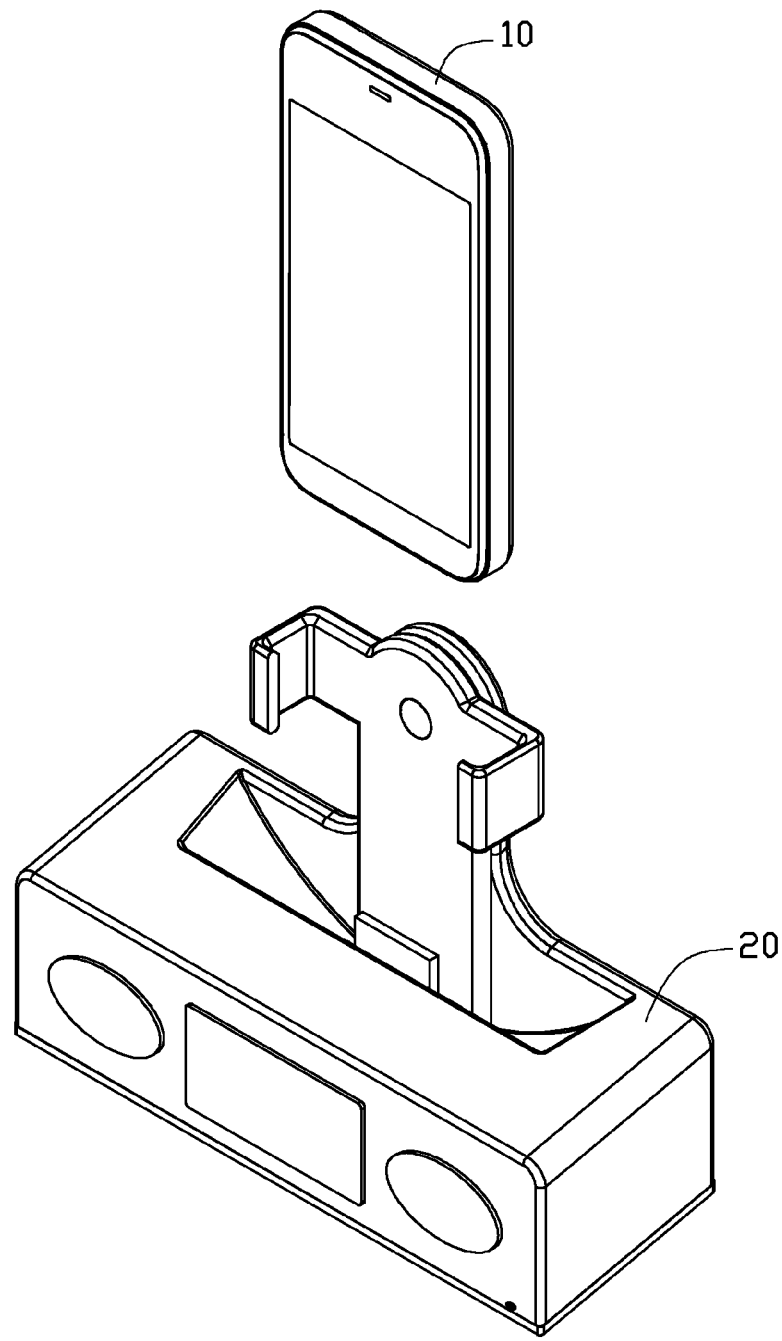
FIG. 1 is a perspective view of a docking station for supporting an electronic device in accordance with an embodiment.

Referring to FIG. 1, a docking station 20 for supporting an electronic device 10 in accordance with an embodiment is shown. The electronic device 10 may be a cellular phone, a personal digital assistant (PDA), or a media player, for example. The docking station 20 is capable of supporting the electronic device 10 in different orientations.

Figure 2:
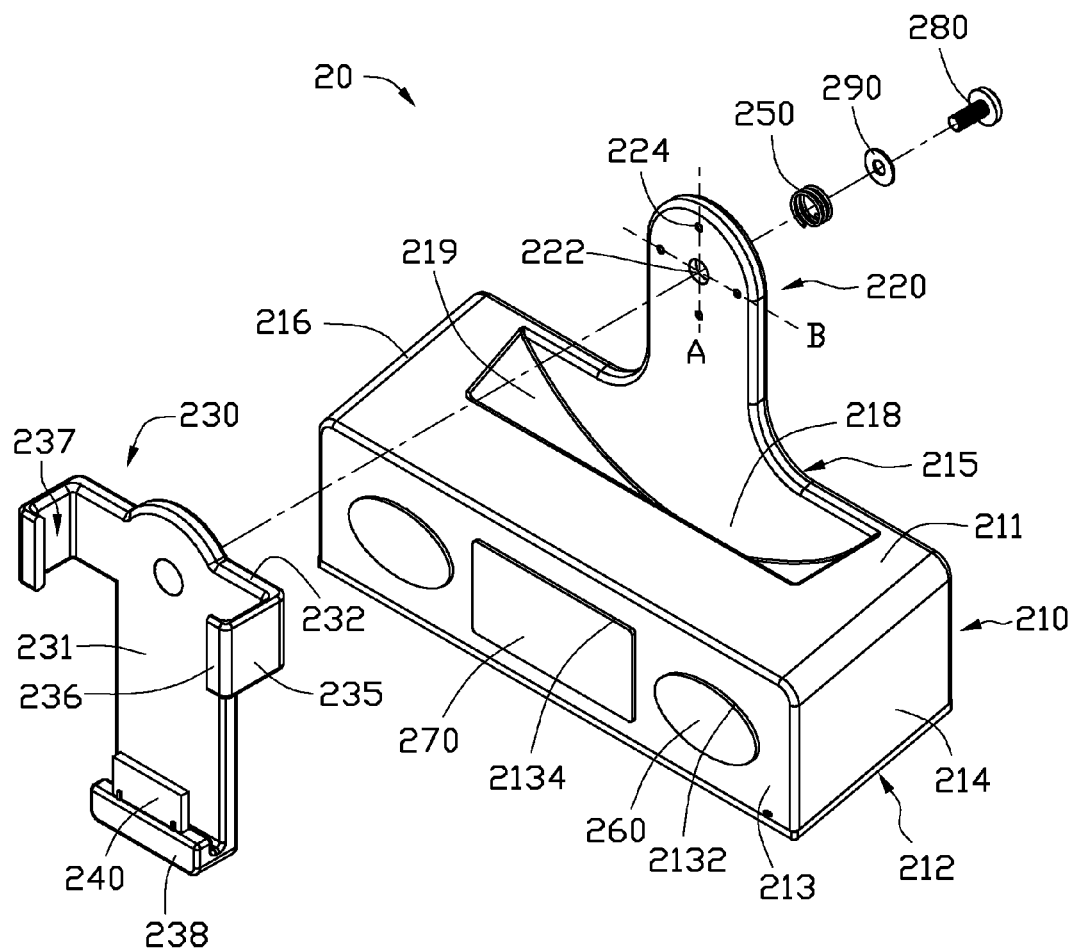
FIG. 2 is a disassembled view of the docking station of FIG. 1.
Figure 3:
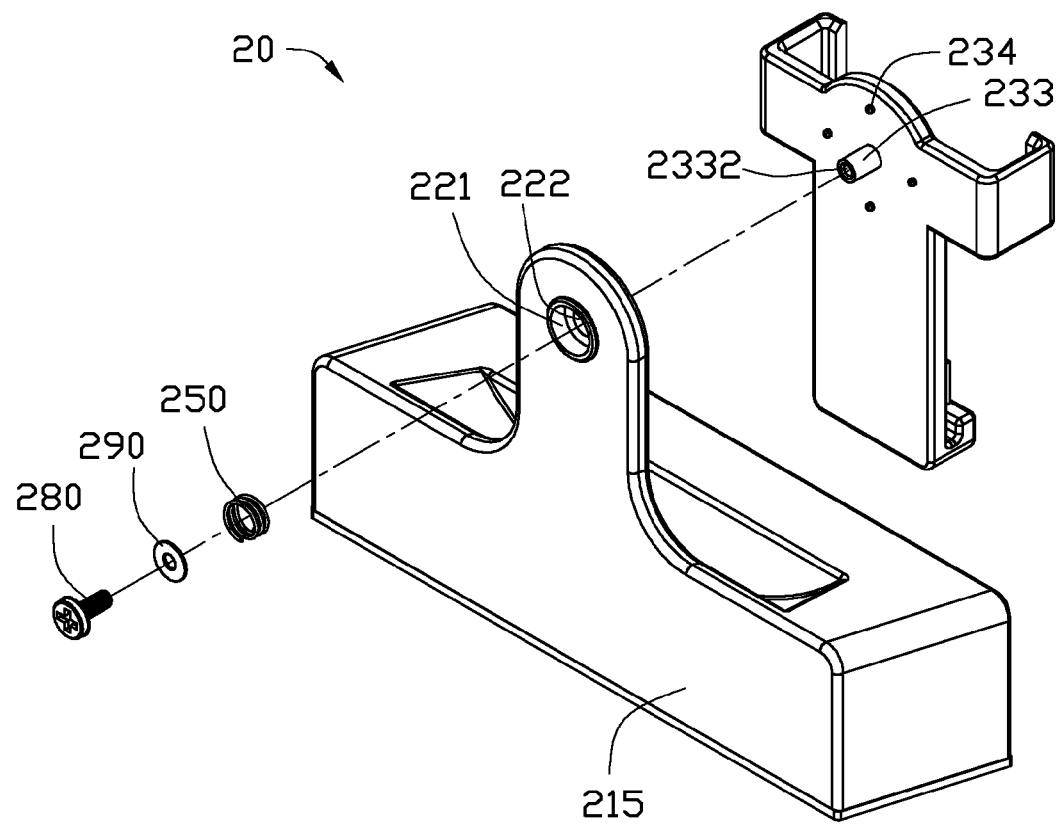
FIG. 3 is similar to FIG. 2, but viewed from another aspect.

Referring to FIGS. 2-3, the docking station 20 includes a main body 210, a supporting arm 220 secured to the main body 210, and a rotating member 230 rotatably coupled to the supporting arm 220. The rotating member 230 holds the electronic device 10, and is rotatable relative to the supporting arm 220 to support the electronic device 10 in different orientations. The docking station 20 further includes two speakers 260 and a display 270, and is capable of being electrically connected to other electronic devices, such as a computer, via a cable (not shown) to function as a loudspeaker. The display 270 is used for displaying information, such as time. Furthermore, an interface 240 is arranged on the rotating member 230 and can be inserted into a socket (not shown) of the electronic device 10 for electrically connecting the electronic device 10 to the docking station 20. Thus, the electronic device 10 can also be electrically connected to and can be in communication with a computer, or be electrically connected to a power source.

The main body 210 is substantially rectangular parallelepiped shaped, and includes a top wall 211, a bottom wall 212, and four sidewalls (hereinafter, a first sidewall 213, a second sidewall 214, a third sidewall 215 opposite to the first sidewall 213, and a fourth sidewall 216 opposite to the second sidewall 214) perpendicular to the bottom and top walls 211, 212. The four sidewalls 213, 214, 215, 216 cooperate with the bottom and the top walls 201, 202 to define an accommodating space (not shown) for receiving the speakers 260, the display 270 and other electronic components of the docking station 20.

The top wall 211 defines a notch 218. The notch 218 is arranged adjacent to the third sidewall 215. The notch 210 includes an arcuate surface 219. Two apertures 2132 are respectively defined at opposite ends of the first sidewall 213. The speakers 260 are respectively exposed out of the main body 210 via the apertures 2132. The first sidewall 213 further defines a rectangular hole 2134 for receiving the display 270. The rectangular hole 2134 is arranged between the apertures 2132.

The supporting arm 220 extends from the top wall 211 and is arranged between the notch 218 and the third sidewall 215. The supporting arm 220 is coplanar with the third sidewall 215 in the embodiment. A recess 221 is defined at an end of the supporting arm 220 away from the top wall 211. The bottom of the recess 221 further defines a through hole 222. The arcuate surface 219 extends along the perimeter of a circle with the through hole 222 as the centre. A plurality of positioning holes 224 are spaced and defined around the through hole 222. The positioning holes 224 are arranged on the perimeter of another circle with the through hole 222 as the centre. In the embodiment, the number of the positioning holes 224 is four, a pair of opposite positioning holes 224 are aligned in a line A parallel to the top wall 211, and other pair of opposite positioning holes 224 are aligned in a line B perpendicular to the top wall 211.

The rotating member 230 is substantially T-shaped, and includes a base 231 and two connecting portions 232 perpendicularly arranged at opposite sides of the base 231. A shaft 233 projects from the base 231. The shaft 233 is rotatably received in the through hole 222, and defines a fixing hole 2332 extending therethrough. Four protrusions 234 protrude from the base 231 and are arranged around the shaft 233. The distance between each protrusion 234 and the shaft 233 are the same. The protrusions 234 respectively correspond to the positioning holes 224 and can be received in the positioning holes 224. An end of each connecting member 232 away from the base 231 perpendicularly bends in a direction reverse to the shaft 233 to form a retaining portion 235. Ends of retaining portions 235 away from the base 231 further respectively bend internally to form two opposite hooks 236. The hooks 236 cooperate with the corresponding connecting portions 232 to prevent the electronic device 10 from moving in a direction perpendicular to the base 231. An end of the base 231 away from the connecting portions 232 bends in a direction reverse to the shaft 233 to form a supporting portion 238. The supporting portion 238, the connecting portions 232, the base 231, the retaining portions 235, and the hooks 236 cooperatively define a receiving space 237 for retaining the electronic device 10.

Furthermore, in the embodiment, the distance between the shaft 233 and the supporting portion 238 is less than the distance between the through hole 222 and the arcuate surface 219, such that the rotating member 230 is rotatable clockwise and anti-clockwise relative to the supporting arm 220. In another embodiment, the distance between the shaft 233 and the supporting portion 238 is less than the distance between the through hole 222 and the top wall 221, thus, the rotating member 230 is able to rotate clockwise and anti-clockwise relative to the supporting arm 220 without the notch 219.

The interface 240 is mounted to the supporting portion 230 and is arranged parallel to the base 231. The interface 240 can be inserted into the electronic device 10 to electrically connect the electronic device 10 to the docking station 20 when the electronic device 10 is received in the receiving space 237.

The docking station 20 further includes an elastic element 250, a fixing member 280 and a stopper 290. The elastic element 250 is received in the recess 221, and provides an elastic force for driving the rotating member 230 to resist against the supporting arm 220 with the protrusions 234 respectively received in the positioning holes 224. In addition, the elastic element 250 allows the rotating member 230 to move in a direction parallel to the shaft 233 such that the protrusions 234 is allowed to disengage from the positioning holes 224. The fixing member 280 secures the rotating member 230 to the supporting arm 220 and further cooperates with the stopper 290 to press and limit the elastic element 250 in the recess 221.

In assembly, first, the shaft 233 extends through the through hole 222. Second, the elastic element 250 sleeves on the shaft 233, and is pressed by the stopper 290 to be elastically deformed. Finally, the fixing member 280 extends through the stopper 290, and is secured to the fixing hole 2332. As a result, the rotating member 230 is rotatably secured to the supporting member 220. Furthermore, with assistance of the deformed elastic element 250, the protrusions 234 engage with the positioning holes 224 to position the rotating member 230 in a desired position.

Figure 4:
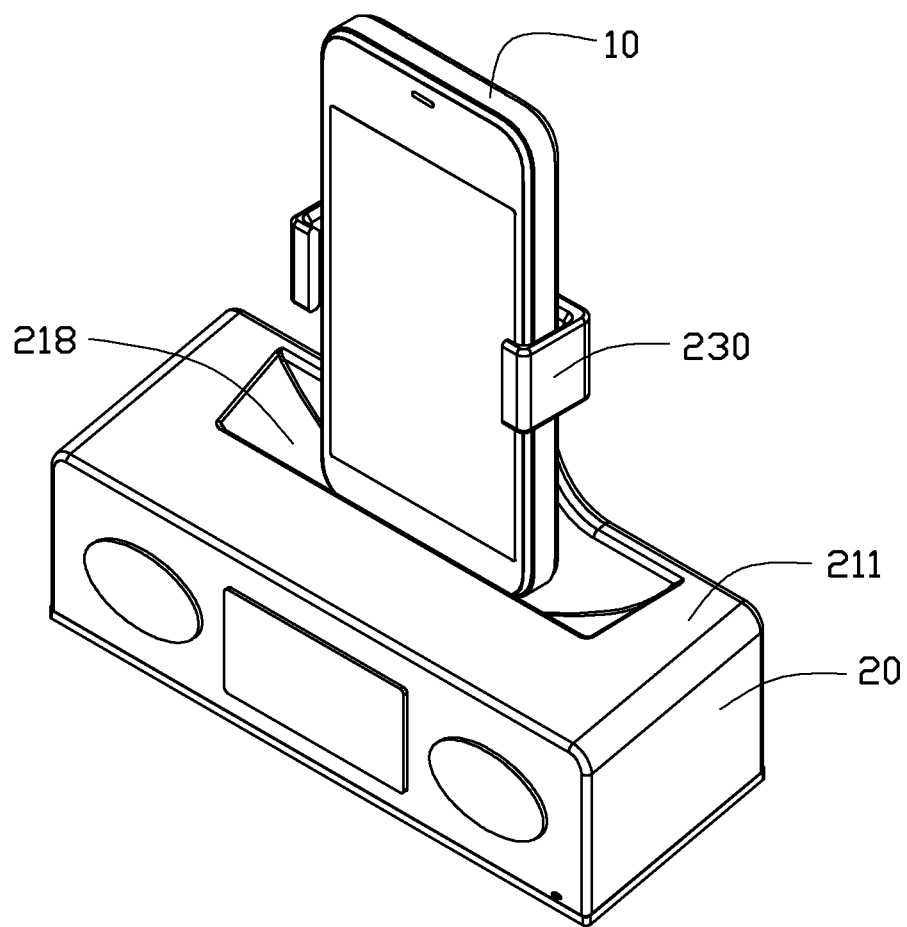
FIG. 4 is an explanatory view showing the electronic device of FIG. 1 being supported in a first orientation by the docking station.
Figure 5:
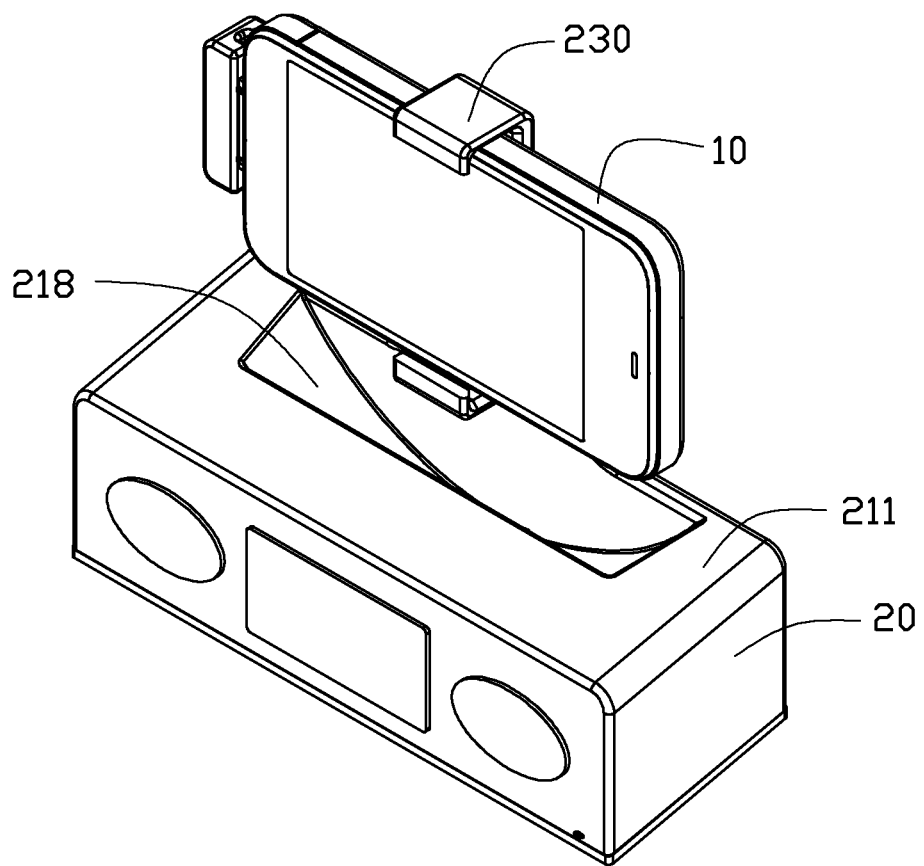
FIG. 5 is an explanatory view showing the electronic device of FIG. 1 being supported in a second orientation by the docking station.

Referring to FIGS. 1 and 4, when the rotating member 230 is rotated with the base 231 perpendicular to the top wall 211 and the supporting portion 238 adjacent to the top wall 211, the rotating member 230 is in a first position. At this time, the electronic device 10 can be received in the receiving space 237 and is supported in the first orientation. Referring to FIG. 5, when the rotating member 230 is rotated clockwise (or anticlockwise) with the base 231 parallel to the top wall 211, the rotating member 230 is in a second position, and the electronic device 10 is supported in the second orientation.

With assistance of the docking station 20, the electronic device 10 is capable of being supported in different orientations, which is convenient.

Even though information and the advantages of the present embodiments have been set forth in the foregoing description, together with details of the structures and functions of the present embodiments, the disclosure is illustrative only; and changes may be made in detail, especially in matters of shape, size, and arrangement of parts within the principles of the present embodiments to the full extent indicated by the broad general meaning of the terms in which the appended claims are expressed.

What is claimed is:

1. A docking station for an electronic device, comprising:
a main body comprising a top wall, the top wall defining a notch having an arcuate surface;
a supporting arm projecting from the main body and defining a through hole; and
a rotating member rotatably coupled to the supporting arm centered at the through hole and used for retaining the electronic device, and comprising a shaft, at least one protrusion arranged around the shaft, a base and two connecting portions arranged at opposite sides of the base;
wherein the arcuate surface extends along a perimeter of a circle centered at the through hole, an end of each connecting portion bends in a direction reverse to the shaft to form a retaining portion, ends of the retaining portions further bend to form opposite hooks, an end of the base away from the connecting portion bends in a direction reverse to the shaft to form a supporting portion, the distance between the shaft and the supporting portion is less than the distance between the through hole and the arcuate surface; the supporting portion, the retaining portions, the hooks, the connecting portions and the base cooperatively define a receiving space for receiving the electronic device; the rotating member is capable of rotating from a first position to a second position different from the first position; when the rotating member rotates to the first position, the electronic device is supported in a first orientation, and when the rotating member rotates to the second position, the electronic device is supported in a second orientation different from the first orientation.

2. A docking station for an electronic device, comprising:
a main body;
a supporting arm projecting from the main body and defining a through hole;
a rotating member rotatably coupled to the supporting arm and used for retaining the electronic device, the rotating member capable of rotating from a first position to a second position different from the first position, the rotating member defining a shaft;
an elastic element sleeving on the shaft;
a fixing member; and
a stopper;
wherein the main body comprises a top wall, a recess is defined at an end of the supporting arm away from the top wall, the through hole is defined at the bottom of the recess; the fixing member secures the rotating member to the supporting arm and cooperates with the stopper to press and limit the elastic element in the recess, the elastic element provides an elastic force for resisting the rotating member against the supporting arm; when the rotating member is positioned at the first position, the electronic device is received in the rotating member and is supported in a first orientation, and when the rotating member rotates to the second position, the electronic device is supported in a second orientation.

* * * * *